Patented Aug. 30, 1938

2,128,514

UNITED STATES PATENT OFFICE 2,128,514

VAT DYESTUFFS AND A PROCESS OF PREPARING THEM

Wilhelm Eckert and Ernst Fischer, Frankfort-on-the-Main-Hoechst, Germany, assignors to General Aniline Works, Inc., New York, N. Y., a corporation of Delaware No Drawing. Application August 2, 1934, Serial No. 738,159. In Germany August 9, 1933

16 Claims. (Cl. 260—335)

The present invention relates to vat dyestuffs and to a process of preparing them.

We have found that valuable vat dyestuffs are obtainable by causing to react at raised temperature and in the presence of a diluent or a solvent a benzoquinone compound with a dihydrodianthrone which is easily obtainable for instance by treating anthrone with an oxidizing agent and which has the following constitution:

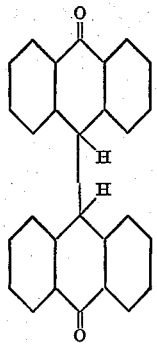

or with a substitution product thereof. It is advantageous to cause the components to react with one another in a boiling solvent or diluent for several hours, for instance, 10–20 hours. The vat dyestuffs have probably the following constitution

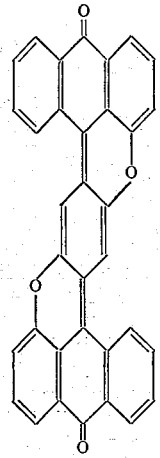

wherein there may be present substituents. They dissolve in concentrated sulfuric acid to a brown violet solution and dye the vegetable fiber from a red violet vat blue or green tints. They may be halogenated in the usual manner whereby green vat dyestuffs are obtained which are distinguished by a great clearness of shade.

The following examples serve to illustrate the invention, but they are not intended to limit it thereto. The parts are by weight unless otherwise stated, the relationship between parts by weight and parts by volume being that which exists between a kilogram and a liter:

1. 100 parts of dihydrodianthrone of the formula:

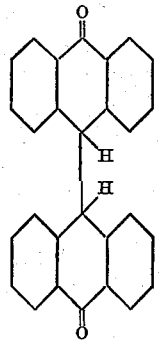

are boiled for 18 hours under reflux with 100 parts of benzoquinone in 1000 parts by volume of chlorobenzene. After cooling, the dark crystalline magma is filtered with suction and washed with chlorobenzene until the latter no longer assumes a green color. The residue is purified by boiling it out with a mixture equal parts of alcohol and about 1N-caustic soda solution until the hot filtrate no longer shows a brown color. The solid matter is washed until neutral and dried; it forms a crystalline greenish-black powder having a bronze-like luster. By recrystallization from high-boiling solvents, such as nitrobenzene, trichlorobenzene, crystalline needles are obtained which by transmitted light have a green-blue color and dissolve in concentrated sulfuric acid to a brownish-violet solution. The dyestuff yields in a cold solution of caustic soda and hydrosulfite a red-violet vat from which cotton is dyed blue tints.

2. 10 parts of the blue dyestuff above described are heated, while stirring, together with 11 parts of bromine and 100 parts by volume of nitrobenzene while gradually and evenly raising the temperature in the course of 16 hours up to 190° C. Finally, the whole is boiled for ¼ hour in order to eliminate any residue of the hydrogen bromide formed which might still be present. After cooling, the whole is filtered with suction, the residue is washed with a small quantity of cold nitrobenzene and, finally, with alcohol until the nitrobenzene is removed. The solid matter is dried and forms a green powder which dissolves in sulfuric acid to a brownish-violet solution; it dyes cotton from a cold bluish-violet hydrosulfite vat clear green shades.

3. 100 parts of dyhydrodianthrone are boiled under reflux for 18 hours with 100 parts of monochloroquinone in 1000 parts by volume of chlorobenzene whereby hydrogen chloride escapes. After cooling, the solid matter is filtered with suction and purified as described in Example 1. It is identical with the dyestuff obtained according to Example 1.

4. By treating 3.3'-dichlorodihydrodianthrone of the formula:

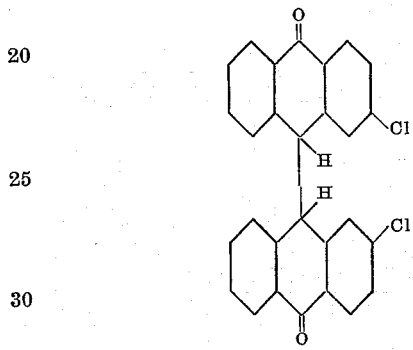

with benzoquinone in the manner described in Example 3, a dyestuff is obtained which crystallizes from nitrobenzene in the form of bluish-green needles. It dissolves in concentrated sulfuric acid to a violet solution and dyes cotton from a red-violet vat bluish green tints. It contains 12% of chlorine. The dyestuff thus obtainable may be halogenated according to known methods, for instance, by means of sulfurylchloride in nitrobenzene. 3.3'-dichlorodyhydrodianthrone is obtainable by boiling 3-chloroanthrone in glacial acetic acid with an excess of ferric chloride whereby it precipitates in the form of colorless needles. When recrystallized from glacial acetic acid it melts at 247° C. to 248° C. According to Eckert in "Monatshefte für Chemie" vol. 39, page 847, 3-chloroanthrone is obtainable by reduction of 2-chloroanthraquinone with aluminium powder in concentrated sulfuric acid. It crystallizes from glacial acetic acid in the form of feebly yellowish needles melting at 138° C. to 140° C., which differ distinctly from the nearly colorless prisms of the synthetically prepared 2-chloroanthrone, melting at 150° C.

5. 10 parts of 2.2'-dimethyldihydrodianthrone of the formula:

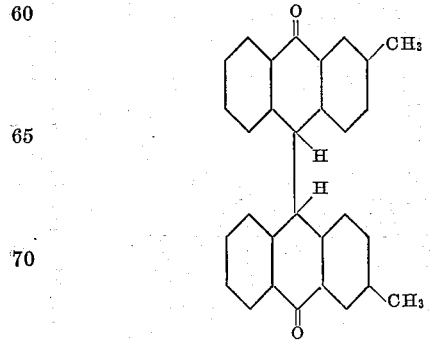

are boiled with 10 parts of benzoquinone in 10 times their weight of chlorobenzene for several hours. The reaction product is filtered with suction, while cold, and purified according to the statements in Example 1. It forms a green dyestuff which dissolves in concentrated sulfuric acid to a violet solution and dyes cotton from a red-violet vat green tints.

2-methyl-9-anthrone may be obtained from para-methyl-benzoyl-benzoic acid by way of para-methylbenzyl-benzoic acid and by ring closure of the latter. The anthrone mentioned, on oxidation of its glacial acetic acid solution with ferric chloride, yields, 2.2'-dimethyldihydrodianthrone which crystallizes from benzene in the form of fine colorless needles melting at 208° C. to 209° C. It has the same melting point as the product described by Barnett in "Berichte der deutschen chemischen Gesellschaft" vol. 65, page 1565.

6. 3.3'-dimethyldihydrodianthrone of the formula:

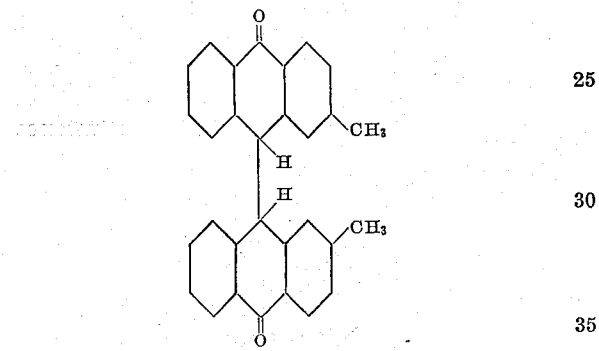

are boiled with the equal quantity of benzoquinone for several hours in trichlorobenzene and the reaction product is purified as described in the preceding examples. The dyestuff dissolves in concentrated sulfuric acid to a violet solution and dyes cotton from a red-violet vat green tints. The shade is somewhat bluer than that of the dyeing obtained with the dyestuff of Example 5.

3.3'-dimethyldihydrodianthrone is obtainable according to Barnett in "Journal of the Chemical Society", London, 1929, page 1758, from 2-methyl-anthraquinone by reduction to 3-methyl-9-anthrone (melting at 100° C.) and oxidation of the latter in glacial acetic acid with ferric chloride. It crystallizes from benzene in the form of colorless needles and has the melting point of 239° C., as given by Barnett in "Berichte der deutschen chemischen Gesellschaft", vol. 65, page 1565.

7. 100 parts of para-dichlorobenzoquinone are heated to boiling with 100 parts of dihydrodianthrone in 1000 parts by volume of trichlorobenzene. The precipitate thus formed is filtered with suction, while cold, and heated for 1 hour to gentle boiling in a mixture of 2000 parts of alcohol and 100 parts by volume of concentrated caustic soda solution. The dyestuff is filtered, while hot, washed first with a cold mixture of alcohol and caustic soda solution until a colorless filtrate is obtained, and heated to boiling in a sodium chloride solution of 4% strength; the whole is filtered with suction and the solid matter is washed with hot water until neutral. It is identical with the dyestuff obtainable according to Example 1.

8. 20 parts of dihydrodianthrone and 20 parts of chloranil are boiled for 18 hours under reflux in 200 parts of chlorobenzene. The precipitate is filtered with suction, while cold, extracted several times with hot glacial acetic acid and then heated to boiling with a mixture of alcohol and caustic soda solution. Thereupon, it is purified as stated in Example 7. The dyestuff crystallizes from nitrobenzene in the form of bluish-green needles, having an intense metallic luster. It contains 11½% of chlorine, dissolves in concentrated sulfuric acid to a violet-red solution and dyes cotton from a blue vat clear green tints.

9. 1.1'-dichlorodihydrodianthrone (melting at 296° C.) of the formula:

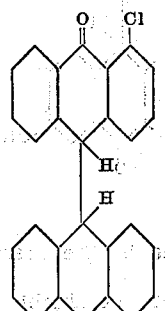

(obtainable by oxidation of 1-chloranthrone formed by reduction of 1-chloroanthraquinone, with copper and concentrated sulfuric acid, according to "Monatshefte der chemischen industrie", vol. 39, page 847) is condensed with benzoquinone, according to the statements in the foregoing examples. The dyestuff, when purified according to the above statements, crystallizes from nitrobenzene in the form of blue needles. It contains 12% of chlorine, dissolves in concentrated sulfuric acid to a violet-red solution and forms a violet leuco compound.

10. 1.8-dichloroanthraquinone is transformed by means of copper and sulfuric acid into 1.8-dichloroanthrone (melting at 167° C.) and the latter is converted according to Barnett ("Journal of the Chemical Society" London, vol. 123, 1923, page 2556) into 1.1'-8.8'-tetrachlorodihydrodianthrone (melting at 325° C.) and having the formula:

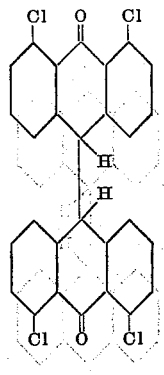

This dihydrodianthrone is boiled for 18 hours with benzoquinone in dichlorobenzene. The dyestuff thus obtained crystallizes, when purified as above described, from nitrobenzene in the form of blue needles which dissolve in concentrated sulfuric acid to a violet solution and contain 20.7% of chlorine.

11. By using instead of the dihydrodianthrone, used in Examples 1, 2.2'-diphenyl-dihydrodianthrone of the following constitution:

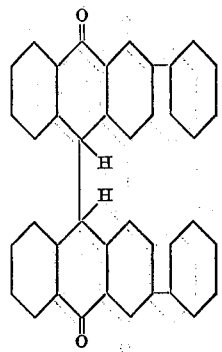

and proceeding otherwise as described in that example, there is obtained a dyestuff in the form of bronze-colored crystals; it dissolves in concentrated sulfuric acid to a violet-red solution and dyes the vegetable fiber from a violet vat green tints.

We claim:
1. The process which comprises boiling for 18 hours in a reflux apparatus dihydrodianthrone of the constitution

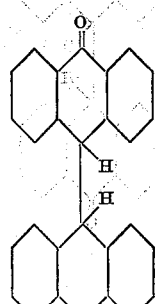

with benzoquinone in the presence of chlorobenzene.

2. The process which comprises boiling for several hours in a reflux apparatus 2.2'-dimethyl-dihydrodianthrone of the formula

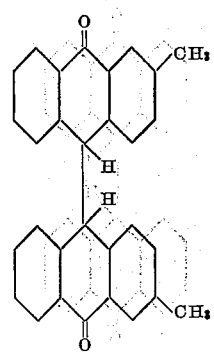

with benzoquinone in the presence of chlorobenzene.

3. The process which comprises boiling for 18 hours in a reflux apparatus dihydrodianthrone of the constitution

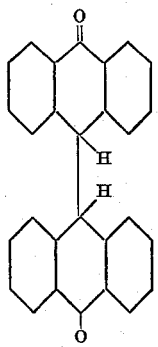

with chloranil in the presence of chlorobenzene.

4. The process which comprises boiling for 18 hours in a reflux apparatus dihydrodianthrone of the constitution

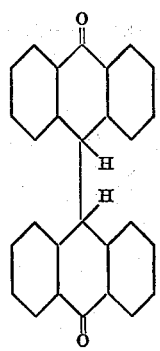

with benzoquinone in the presence of chlorobenzene and heating, while stirring, the dyestuff thus obtained after its purification, with about the same amount by weight of bromine in presence of nitrobenzene within about 19 hours up to about 190° C.

5. The compound obtainable by the process which comprises boiling for 18 hours in a reflux apparatus dihydrodianthrone of the constitution

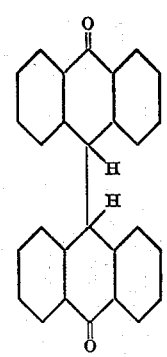

with benzoquinone in the presence of chlorobenzene.

6. The compound obtainable by the process which comprises boiling for several hours in a reflux apparatus 2.2' dimethyldihydrodianthrone of the formula

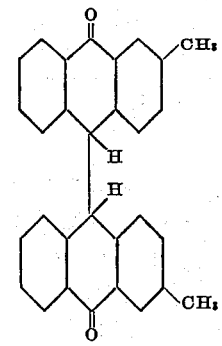

with benzoquinone in the presence of chlorobenzene.

7. The compound obtainable by the process which comprises boiling for 18 hours in a reflux apparatus dihydrodianthrone of the constitution

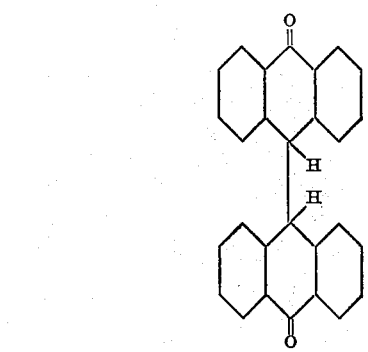

with chloranil in the presence of chlorobenzene.

8. The compound obtainable by the process which comprises boiling for 18 hours in a reflux apparatus dihydrodianthrone of the constitution with benzoquinone in the presence of chlorobenzene and heating, while stirring, the dyestuff thus obtained after its purification, with about the same amount by weight of bromine in presence of nitrobenzene within about 19 hours up to about 190° C.

9. The process which comprises heating a dihydrodianthrone of the general formula

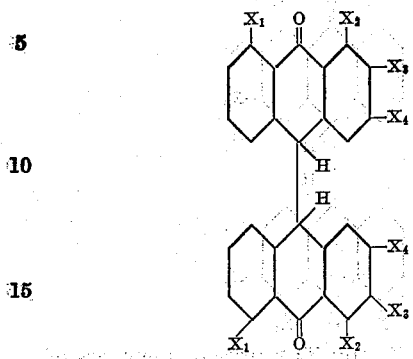

wherein $X_1$, $X_2$, $X_3$ and $X_4$ represent members of the group consisting of hydrogen, halogen, alkyl and aryl of the benzene series and the equally numbered X's have the same value, with a benzoquinone compound in the presence of a solvent.

10. The process which comprises heating a dihydrodianthrone of the general formula:

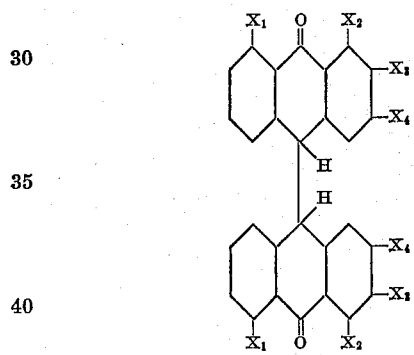

wherein $X_1$, $X_2$, $X_3$ and $X_4$ represent members of the group consisting of hydrogen, halogen, alkyl and aryl of the benzene series and the equally numbered X's have the same value, with a benzoquinone compound in the presence of a solvent and halogenating the compound thus obtained.

11. The process which comprises boiling for several hours a dihydrodianthrone of the general formula

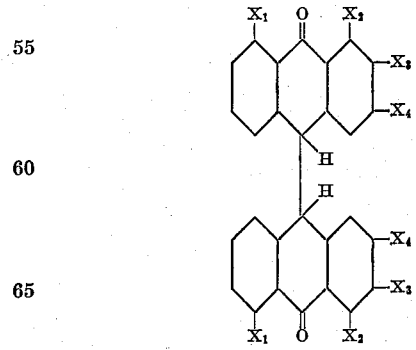

wherein $X_1$, $X_2$, $X_3$ and $X_4$ represent members of the group consisting of hydrogen, halogen, alkyl and aryl of the benzene series and the equally numbered X's have the same value, with a benzoquinone compound in the presence of a solvent.

12. The process which comprises boiling for several hours a dihydrodianthrone of the general formula

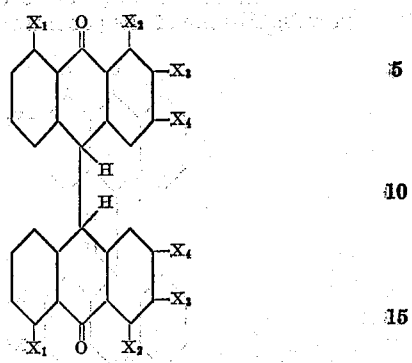

wherein $X_1$, $X_2$, $X_3$ and $X_4$ represent members of the group consisting of hydrogen, halogen, alkyl and aryl of the benzene series and the equally numbered X's have the same value, with a benzoquinone compound in the presence of a solvent and halogenating the compound thus obtained.

13. The compounds obtainable by the process which comprises heating a dihydrodianthrone of the general formula

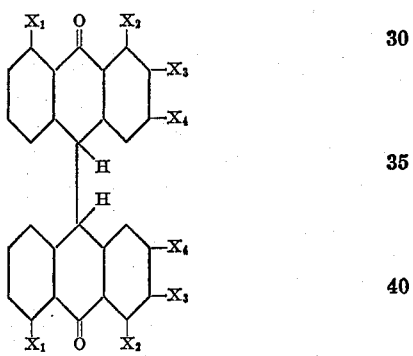

wherein $X_1$, $X_2$, $X_3$ and $X_4$ represent members of the group consisting of hydrogen, halogen, alkyl and aryl of the benzene series and the equally numbered X's have the same value, with a benzoquinone compound in the presence of a solvent.

14. The compounds obtainable by the process which comprises heating a dihydrodianthrone of the general formula

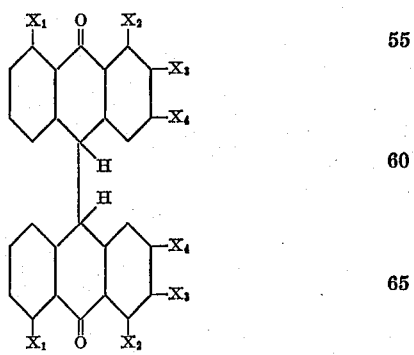

wherein $X_1$, $X_2$, $X_3$ and $X_4$ represent members of the group consisting of hydrogen, halogen, alkyl and aryl of the benzene series and the equally numbered X's have the same value, with a benzoquinone compound in the presence of a solvent and halogenating the compound thus obtained.

15. The compounds obtainable by the process which comprises boiling for several hours a dihydrodianthrone of the general formula

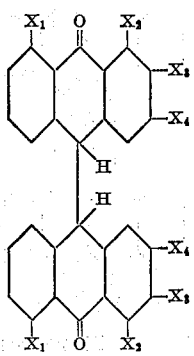

wherein $X_1$, $X_2$, $X_3$ and $X_4$ represent members of the group consisting of hydrogen, halogen, alkyl and aryl of the benzene series and the equally numbered X's have the same value, with a benzoquinone compound in the presence of a solvent.

16. The compounds obtainable by the process which comprises boiling for several hours a dihydrodianthrone of the general formula

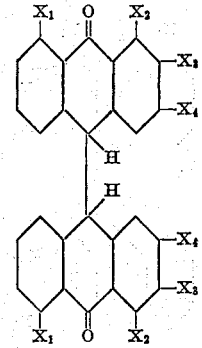

wherein $X_1$, $X_2$, $X_3$ and $X_4$ represent members of the group consisting of hydrogen, halogen, alkyl and aryl of the benzene series and the equally numbered X's have the same value, with a benzoquinone compound in the presence of a solvent and halogenating the compound thus obtained.

WILHELM ECKERT.
ERNST FISCHER.